March 14, 1961 L. F. BIRD 2,975,333
OPERATING CIRCUIT FOR HIGH PRESSURE ARC LAMPS
Filed Nov. 13, 1958
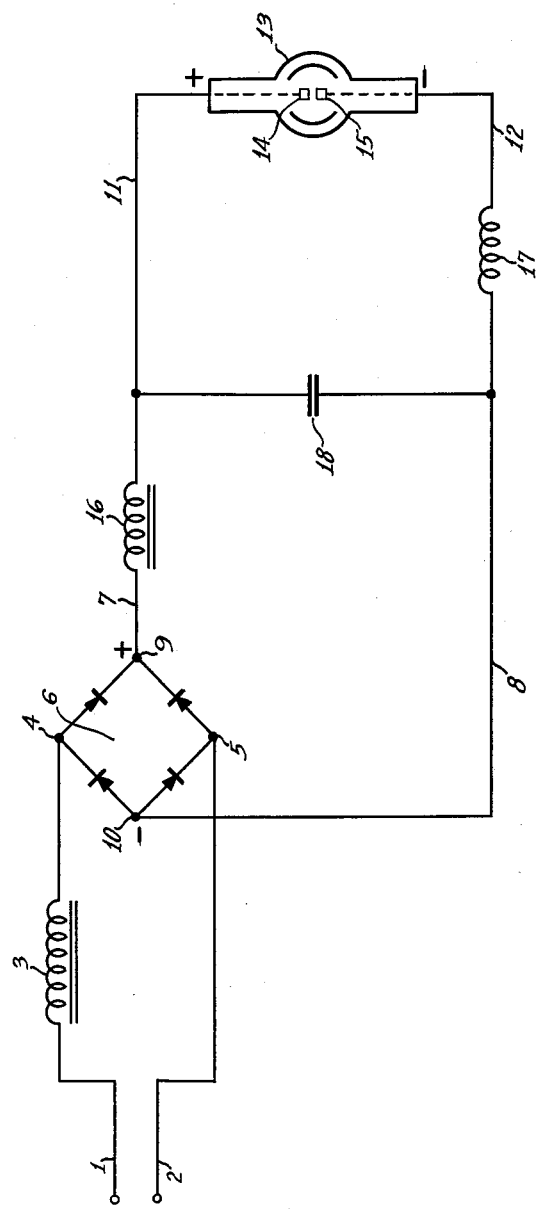
INVENTOR.
LESTER F. BIRD
BY
ATTORNEYS

United States Patent Office 2,975,333
Patented Mar. 14, 1961

2,975,333

OPERATING CIRCUIT FOR HIGH PRESSURE ARC LAMPS

Lester F. Bird, Newark, N.J., assignor to Engelhard Hanovia, Inc., a corporation of New Jersey Filed Nov. 13, 1958, Ser. No. 773,590

1 Claim. (Cl. 315—205)

The present invention deals with an operating circuit for high pressure arc lamps, and more particularly with an operating circuit for compact type arc lamps.

Arc lamps of the type having a light transmissive envelope containing a pair of electrodes spaced apart less than one centimeter, e.g. five millimeters, and an ionizable atmosphere in excess of one atmosphere pressure, have been operated from alternating or direct current. Those operated from alternating current supplies have been difficult to start if the supply voltage were below about 150 volts. Those operating from direct current have been easily started with direct current voltages of about 100 volts. The provision of the higher voltage for alternating current operation was difficult because it is in excess of the commonly supplied voltage values. It has, therefore, been necessary to provide a transformer to raise the usual line voltage from the common value of 115 volts to a value somewhat near the 150 volt ignition voltage when operating compact arc lamps from alternating current. Such a transformer is expensive and heavy for equipment where weight is very important.

There is an inherent problem with the operation of the direct current lamps because of the type of ballast that has been employed. The ballast has been a resistor in almost every case and the power loss in the resistor was almost equal to or greater than the power consumed by the lamps. In many cases it is much more. The lamps commonly operated with a voltage drop of 30 volts when the supply was 100 volts. The difference is consumed in the resistor ballast and the efficiency of the system is poor and in many cases the additional heat dissipated by the ballast is objectionable.

It is an object of the present invention to provide an operating circuit for a high pressure direct current operating arc lamp and which enables the lamp to operate from a source of alternating current under usual line voltages. It is another object of the invention to provide an operating circuit for a high pressure direct current operating arc lamp and which operates in the absence of the heretofore necessary power consuming resistor ballast in the direct current circuit. Other objects and advantages of the invention will become apparent from the description hereinafter following and the drawing forming a part hereof.

The invention relates to an operating circuit for a high pressure or compact type arc lamp, wherein the lamp is a direct current operating lamp operated from rectified alternating current and whereby the use of the usual power consuming resistor ballast in the direct current circuit is avoided so that the lamp is ignited and operates with high efficiency.

Referring to the illustration, the circuit of the invention comprises conductors 1 and 2 connectable to a source of alternating current supply voltage, e.g. 120 volts or less, and having a series reactor ballast 3 in at least one of the conductors. For example, the resistor ballast 3 has an impedance values of about 3.7 ohms for operation with a 30 ampere lamp operated at 30 volts. The series circuit comprising conductors 1 and 2 and ballast 3 is connected across the input terminals 4 and 5 of a full wave or bridge type rectifier 6. Rectifier output conductors 7 and 8 are connected across the resistor outputs 9 and 10 and connected to the input leads 11 and 12 of lamp 13.

The lamp 13 contains an ionizable atmosphere in excess of one atmosphere pressure, when the lamp is operating, and a pair of spaced electrodes 14 and 15 spaced apart less than one centimeter and each electrode being connected to one of the input leads 11 and 12. A smoothing reactor 16 is connected into one of the conductors 7 and 8 in series with the lamp 13. The smoothing reactor 16 need be only of a few ohms value and is necessary to keep the lamp lighted because of the direct current pulses resulting from the alternating current input into rectifier 6.

While the circuit described above is sufficient to ignite a direct current lamp under usual high pressure conditions, there are instances where super high lamp pressures are desirable and in such case the circuit is provided with an ignition means including the secondary winding 17 of a high frequency transformer in series with the lamp 13 and in one of the conductors 7 and 8. In such case, a radio frequency by-pass capacitor 18 is connected across the conductors 7 and 8 between the smoothing reactor 16 and high frequency secondary winding 17, whereby the high frequency sources are confined to that position of the circuit nearest the lamp and isolated from the rectifier 6 and reactor 16.

When the circuit is energized by applying line voltage to the rectifier 6, the voltage at the lamp terminals is almost the same as the line voltage at the rectifier output 4 and 5. Ordinarily the lamp ignites at such voltage and immediately thereafter the lamp drops to the measured operating voltage of the lamp, e.g. 30 volts, and the rectifier output voltage assumes a value only slightly higher than the lamp voltage, the value depending on the internal resistance of the rectifier 6.

The main series ballast reactor 3 filters or absorbs the difference in voltage between the rectifier and line voltage. No other stabilizing ballast is needed and the lamp operates at high efficiency.

When the lamp fails to ignite at the normal line voltage, the frequency transformer winding 17 is energized momentarily for lamp ignition and the lamp operates normally as described above.

While the invention has been described in connection with the circuit illustrated, various modifications thereof are contemplated within the scope of the appended claim.

What I claim is:

An operating circuit for a high pressure arc lamp comprising electrical conductors connectable directly to a line source of alternating current, a first series reactor in at least one of the conductors, a full wave rectifier having input and output means, the conductors including the said reactor being connected to the rectifier input means, rectifier output conductors connected to the rectifier output means, a high pressure arc lamp, the rectifier output conductors being connected to the terminals of the high pressure arc lamp, a second series reactor in at least one of the rectifier output conductors, a secondary winding of a radio frequency transformer connected in one of the rectifier output conductors near the lamp, a radio frequency by-pass capacitor connected across the rectifier output conductors between the said winding and second series reactor whereby radio frequency components are confined to a portion of the circuit near the lamp and isolated from the second reactor, the circuit having a low resistance such that initially substantially the full line voltage is applied to the lamp.

References Cited in the file of this patent
UNITED STATES PATENTS

| | | |
|---|---|---|
| 2,583,979 | Weitmann | Jan. 29, 1952 |
| 2,757,318 | Noel et al. | July 31, 1956 |
| 2,825,852 | Barton | Mar. 4, 1958 |
| 2,916,669 | Retzer et al. | Dec. 8, 1959 |